United States Patent Office.

WILLIAM N. JORDAN, OF CAMBRIDGE, ASSIGNOR TO CHARLES D. WELD, OF BOSTON, MASSACHUSETTS.

Letters Patent No. 114,017, dated April 25, 1871.

IMPROVEMENT IN PAINTS.

The Schedule referred to in these Letters Patent and making part of the same.

I, WILLIAM N. JORDAN, of Cambridge, in the county of Middlesex and State of Massachusetts, have invented certain Improvements in Paints and the method of preparing them, of which the following is a specification.

This invention relates to an improved composition for paint, and an improvement in the preparation of the same, as will hereinafter more fully appear.

The basis of my improved paint consists of a solution of rubber, composed as follows:

Pure rubber, two and one-half pounds; benzine, (of a specific gravity of about 71°,) forty gallons.

I produce paint of any desired color by adding to this basis as follows:

To three-fourths gallon of solution of rubber as above, japan, one pint; coach-varnish, one-half pint; dry paint, two and one-half pounds.

When black mixture is required I add from one-fourth to one-half pound of dry paint, instead of two and one-half.

Instead of the rubber solution above given, one composed of one and one-fourth pound of rubber, and one and one-fourth pound of gutta-percha, with forty gallons of benzine may be employed.

Gutta-percha has never been used in paint mixtures to my knowledge. Its advantage is in the prevention of oxidation in the lead and other minerals which may be used as body.

The above composition is valuable particularly as a paint for withstanding heat; no oil being used, it consequently will not burn off or blister, and will bear a high degree of heat. This paint on metal has been subjected to a continuous temperature of 180°, without damage.

The rubber solution may be mixed with an equal part of boiled oil for a paint for wood, &c.

I am aware that a rubber solution has been used in this connection, but always in connection with acid, which, as is well known, is liable to corrode and destroy the vitality of the rubber, thus rendering the same of less value.

My solution, which is free from oil, has great and apparent advantages over the solution for which Letters Patent were granted to me September 6, 1870. The fact that solar heat has no effect on my improved composition renders it valuable for painting roofs, &c.

Having thus fully described my invention,

What I claim as new, and desire to secure by Letters Patent, is—

The preparation of paint by the use of rubber solution, as described, compounded with japan, coach-varnish, and dry paint, substantially as described.

In testimony whereof I have signed my name to this specification in the presence of two subscribing witnesses.

WILLIAM N. JORDAN.

Witnesses:
   CARROLL D. WRIGHT,
   CHARLES F. BROWN.